(12) United States Patent
Marshall et al.

(10) Patent No.: US 12,461,554 B2
(45) Date of Patent: Nov. 4, 2025

(54) SYSTEM INCLUDING A SECURE APPLICATION CONFIGURED TO PERFORM A CLOCK UPDATE PROCEDURE

(71) Applicant: NXP USA, Inc., Austin, TX (US)

(72) Inventors: Ray Charles Marshall, Herts (GB); Mohit Satsangi, New Delhi (IN); Andreas Bening, Henstedt-Ulzburg (DE)

(73) Assignee: NXP USA, Inc., Austin, TX (US)

( * ) Notice: Subject to any disclaimer, the term of this patent is extended or adjusted under 35 U.S.C. 154(b) by 160 days.

(21) Appl. No.: 18/458,748

(22) Filed: Aug. 30, 2023

(65) Prior Publication Data

US 2024/0168537 A1 May 23, 2024

(30) Foreign Application Priority Data

Nov. 18, 2022 (EP) .................................... 22208369

(51) Int. Cl.
| | | |
|---|---|---|
| *G06F 1/14* | (2006.01) | |
| *G06F 1/08* | (2006.01) | |
| *G06F 1/3237* | (2019.01) | |
| *G06F 21/57* | (2013.01) | |
| *G06F 21/72* | (2013.01) | |
| *G06F 21/74* | (2013.01) | |

(52) U.S. Cl.
CPC .................. *G06F 1/14* (2013.01); *G06F 1/08* (2013.01); *G06F 1/3237* (2013.01); *G06F 21/57* (2013.01); *G06F 21/725* (2013.01); *G06F 21/74* (2013.01)

(58) Field of Classification Search
CPC ..... G06F 1/06; G06F 1/08; G06F 1/12; G06F 1/14; G06F 1/3237; G06F 21/554; G06F 21/57; G06F 21/74
See application file for complete search history.

(56) References Cited

U.S. PATENT DOCUMENTS

| | | | |
|---|---|---|---|
| 6,772,361 B1 * | 8/2004 | Walsh ...................... | G06F 21/57 713/502 |
| 8,171,336 B2 | 5/2012 | Priel et al. | |
| 8,341,443 B2 | 12/2012 | Voorwinden et al. | |
| 9,292,712 B2 * | 3/2016 | Ståhl ...................... | G06F 21/725 |
| 11,636,199 B2 * | 4/2023 | Donohue .............. | G06F 21/725 726/22 |

(Continued)

FOREIGN PATENT DOCUMENTS

EP      3656107 A1      5/2020

*Primary Examiner* — Thomas J. Cleary

(57) ABSTRACT

A system comprising a real time clock, RTC, and a processor configured to execute a secure application to provide a secure clock and configured to operate in a first low-power-mode and a first normal-mode, and a non-secure application configured to perform a clock modification procedure and configured to operate in a second low-power-mode and a second normal-mode, the system configured to perform a secure clock initialisation procedure comprising obtaining a record of a current time from the RTC based on a transition from the first low-power-mode to the first normal-mode, wherein the secure application is configured to perform a clock update procedure including updating the RTC with a secure record of the current time and wherein the system is further configured to prevent performing the clock modification procedure after the clock update procedure has been performed.

20 Claims, 2 Drawing Sheets

(56) References Cited

U.S. PATENT DOCUMENTS

| | | | |
|---|---|---|---|
| 2003/0174587 A1* | 9/2003 | Bening | H04M 1/724 368/200 |
| 2004/0128528 A1* | 7/2004 | Poisner | G06F 21/725 726/22 |
| 2006/0294593 A1 | 12/2006 | Eldar et al. | |
| 2009/0327795 A1* | 12/2009 | Priel | G06F 1/14 713/600 |
| 2010/0011214 A1* | 1/2010 | Cha | H04W 12/10 713/175 |
| 2010/0070791 A1* | 3/2010 | Priel | G06F 21/81 713/340 |
| 2013/0024716 A1* | 1/2013 | Hadley | G06F 21/79 713/600 |
| 2014/0095887 A1 | 4/2014 | Nayshtut et al. | |
| 2015/0186676 A1* | 7/2015 | Arora | G06F 21/725 713/187 |
| 2018/0088625 A1* | 3/2018 | Krithivas | G06F 21/725 |
| 2020/0151366 A1 | 5/2020 | Chen et al. | |
| 2024/0411354 A1* | 12/2024 | Satsangi | G06F 1/3296 |

\* cited by examiner

SYSTEM INCLUDING A SECURE APPLICATION CONFIGURED TO PERFORM A CLOCK UPDATE PROCEDURE

CROSS-REFERENCE TO RELATED APPLICATIONS

This application claims the priority under 35 U.S.C. § 119 of European Patent application no. 22208369.3, filed on 18 Nov. 2022, the contents of which are incorporated by reference herein.

FIELD

The present disclosure relates to a system and, in particular, a system comprising a real time clock and at least one processor. It also relates to a method for operating said system and an electronic device comprising said system.

BACKGROUND

Secure systems may require a time reference which can be trusted in order to perform time sensitive or secure operations. Systems may utilise a real time clock (RTC) to provide the time reference. However, such real time clocks are susceptible to tampering, which can lead to undesired performance or reduced system security.

SUMMARY

According to a first aspect of the present disclosure there is provided a system comprising:
 a real time clock, RTC, configured to keep a record of a current time,
 at least one processor configured to execute at least a secure application and a non-secure application, wherein
 the secure application is configured to operate in a first low-power-mode and a first normal-mode, wherein the secure application is configured to provide a secure clock for maintaining a secure record of the current time when operating in the first normal-mode, and wherein the secure clock is disabled during the first low-power-mode; and wherein
 the non-secure application is configured to operate in a second low-power-mode and a second normal-mode, wherein the non-secure application is configured to perform a clock modification procedure to update the RTC via a second communication link between the non-secure application and the RTC when the non-secure application is operating in the second normal-mode and not when the non-secure application is operating in the second low-power-mode; and wherein
 the system is configured to cause the secure application to perform a secure clock initialisation procedure comprising obtaining the record of the current time from the RTC for initialising the secure clock based on a transition from the first low-power-mode to the first normal-mode, wherein
 the secure application is configured to perform a clock update procedure as part of a transition from the first normal-mode to the first low-power-mode, the clock update procedure comprising, via a first communication link between the secure application and the RTC, providing for updating of the RTC with the secure record of the current time, and wherein the system is further configured to prevent the non-secure application from performing the clock modification procedure after the clock update procedure has been performed, whilst the secure application is in the low-power-mode and prior to the secure clock initialisation procedure.

In one or more examples the first communication link is a secure communication link and the second communication link is a non-secure communication link.

In one or more embodiments the RTC is a hardware based RTC.

In one or more examples, the RTC is configured to operate during the first low-power-mode, the first normal-mode, the second low-power-mode and the second normal-mode.

In one or more embodiments the system being further configured to prevent the non-secure application from performing the clock modification procedure after the clock update procedure has been performed comprises:
 the system being configured to perform the clock update procedure after the non-secure application has transitioned from the second normal-mode to the second low-power-mode.

In one or more embodiments the system being further configured to prevent the non-secure application from performing the clock modification procedure after the clock update procedure has been performed comprises:
 the system being configured to block communication over the second communication link.

In one or more embodiments the system is configured to perform the clock modification procedure based change in temperature for calibration of the RTC.

In one or more embodiments the non-secure application is configured to be communicably coupled to an external time reference, and wherein the system is further configured to perform the clock modification procedure based on a difference between the RTC and said external time reference.

In one or more examples, said external time reference is:
 derived from one or more signals from a global positioning system, GPS;
 derived from one or more signals from a global navigation satellite system, GNSS; and
 derived from one or more network time protocol signals.

In one or more embodiments based on the transition from the first normal-mode to the first low-power-mode, the system is further configured to compare the record of the current time from the RTC with the secure record of the current time from the secure clock, and wherein
 performing the clock update procedure is conditional on the comparison indicating a difference between the record of the current time and the secure record of the current time above a predetermined threshold.

In one or more examples, the system is configured to not perform the clock update procedure when the difference between the record of the current time and the secure record of the current time is below the predetermined threshold.

In one or more embodiments the system is configured to generate a signal indicative of whether the difference between the record of the current time and the secure record of the current time is above the predetermined threshold or below the predetermined threshold, and wherein
 the system is configured to store the generated signal to provide a record of the status of RTC.

In some other examples the record of the status of the RTC is stored in a memory of the system and or a memory of the at least one processor.

In one or more embodiments the predetermined threshold is based on an elapsed time since a most recent clock initialisation procedure, wherein the elapsed time is based on the secure clock.

In one or more embodiments the secure clock comprises a timer arrangement configured to determine the elapsed time since the most recent clock initialisation procedure, and wherein
the secure record of the current time is based on a snapshot of the current time from the RTC taken during the clock initialisation procedure and the elapsed time.

In one or more embodiments the predetermined threshold is defined as a percentage of the elapsed time.

In one or more examples the at least one processor comprises a single processor comprising at least two cores comprising a first core and a second core, wherein,
the first core is configured to execute the secure application and
the second core is configured to execute a non-secure application.

In one or more examples the at least one processor comprises:
a first processor configured to execute the secure application, and
a second processor configured to execute the non-secure application.

In one or more examples, the secure processor and the non-secure processor are located on separate integrated circuit, IC, dies.

In one or more examples, the first processor comprises a trusted execution environment, TEE, wherein the secure application is executed in said TEE and the non-secure application is not executed in said TEE.

In one or more examples the system forms part of a system on a chip, SOC, arrangement.

In one or more examples the SOC arrangement is a battery powered SOC.

In one or more embodiments the secure application is further configured to perform a secure clock update procedure to update the secure record of the current time based on an authenticated message from a trusted entity.

In one or more embodiments the secure application is configured to perform secure processing at least in part based on said secure record of the current time.

In one or more examples the secure processing includes one or more of:
an application of a cryptographic function to data, and
checking a validity of security certificates.

In one or more examples the non-secure application is configured to have read access to the secure record of the current time to perform time based functions.

According to a second aspect of the present disclosure there is provided an electronic device comprising the system of the first aspect.

According to a third aspect of the present disclosure there is provided a method of operating a system, the system comprising:
a real time clock, RTC, configured to keep a record of a current time;
at least one processor configured to execute at least a secure application and a non-secure application, wherein
the secure application configured to operate in a first low-power-mode and a first normal-mode and wherein the non-secure application is configured to operate in a second low-power-mode and a second normal-mode;
the method comprising:
maintaining, by a secure clock, a secure record of the current time by the secure application when configured to operate in the first normal-mode; and
disabling the secure clock when the secure application is configured to operate in the first low-power-mode;
performing, by the non-secure application, when configured to operate in the second normal-mode a clock modification procedure to update the RTC;
preventing the non-secure application from performing the clock modification procedure when the non-secure application is configured to operate in the second low-power-mode;
performing, by the secure application, a secure clock initialisation procedure comprising obtaining the record of the current time from the RTC for initialising the secure clock based on a transition from the first low-power-mode to the first normal-mode;
performing, by the secure application, a clock update procedure as part of a transition from the first normal-mode to the first low-power-mode, wherein the clock update procedure comprises:
updating the RTC with the secure record of the current time; and
preventing the non-secure application from performing the clock modification procedure after the clock update procedure has been performed, whilst the secure application is in the low-power-mode and prior to a subsequent secure clock initialisation procedure.

In one or more examples the method comprises:
performing the clock update procedure after the non-secure application has transitioned from the second normal-mode to the second low-power-mode.

In one or more examples the method comprises:
performing the clock modification procedure based on a change in temperature for calibration of the RTC.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

The examples of the present disclosure relate to a system that provides a non-secure application, which may be provided by a processor, and a secure application, which may be provided by the processor, a secure subsystem, or a further processor.

The secure application may require a secure time reference that can be trusted in order to perform certain time critical actions. As an example, the secure time reference can be used to ensure the validity of time based certificates. It is undesirable if the secure time reference can be hacked or modified which can lead to the certificate validity times being extended. In some cases, the certificates can be extended such that they never expire which can lead to significant losses to application providers and can also reduce the overall security of the system.

Typically, a hardware based trusted RTC may be provided for the secure application, which may be provided in addition to a general purpose RTC. However, this leads to increased die area and increased power consumption which reduces overall system efficiency and increases manufacturing costs. An alternative option can be to offload the handling or managing of the RTC to the secure application. However, this option leads to additional load on the secure application, which can lead to a reduced response time together with increased power consumption.

In some example embodiments as described herein, there is provided a system that can share the RTC between the secure application and the non-secure application whilst maintaining the integrity of the record of the current time used to perform secure processes or other time critical processes. This approach is useful, particularly for system on a chip (SOC) arrangements which employ low-power or standby modes to achieve an improved energy consumption profile.

Figure 1:
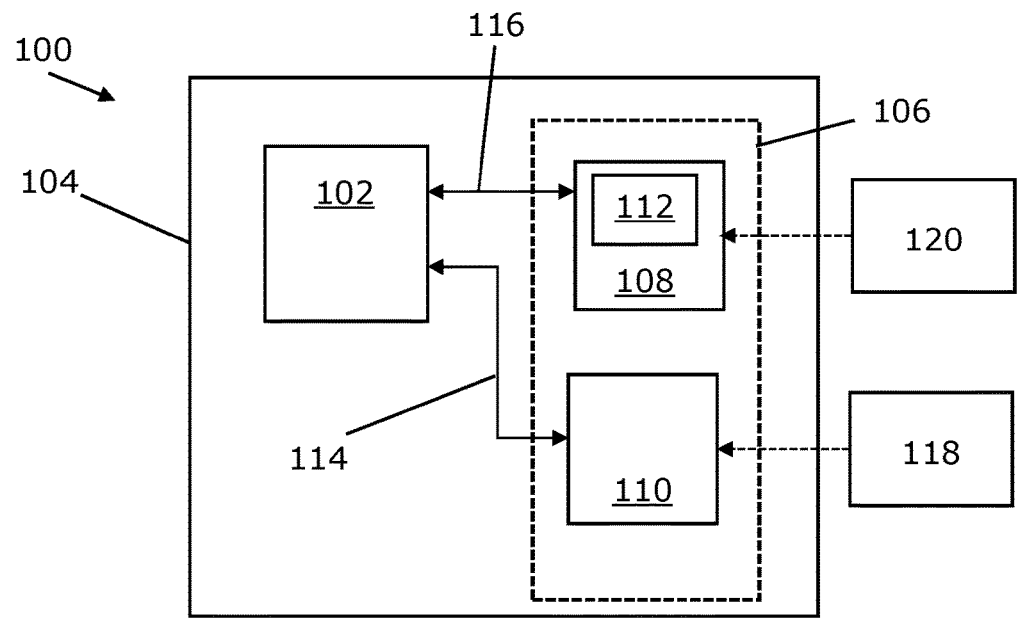
FIG. 1 shows a schematic block diagram of an example embodiment of a system comprising a real time clock and a processor executing at least two applications.

FIG. 1 shows a system 100 comprising a real time clock 102, and at least one processor 106. The RTC 102 is configured to maintain a record of the current time. The at least one processor 106 is configured to host at least one application. Thus, in some examples, the processor 106 may execute software that provides the at least one application. In other examples, the processor 106 may be configured, such as by firmware, to provide the at least one application. In the present example, two applications are provided by the processor 106 comprising a secure application 108 and a non-secure application 110. The secure application 108 may be more secure than the non-secure application 110 and as such may implement one or more security protocols not implemented in the non-secure application 110.

The non-secure application 110 is configured such that it can read and modify the RTC 102 and therefore it is shown as communicably coupled to the RTC 102 via a second communication link 114. The secure application 108 is configured such that it can read and modify the RTC 102 and therefore it is shown that the secure application 108 is communicably coupled to the RTC 102 via a first communication link 116. In some examples it will be appreciated that the first communication link 116 may be a secure communication link. It will be appreciated that the second communication link 114 and/or first communication link 116 represent a logical connection between the respective non-secure and secure applications 108, 110 and the RTC 102 such that the time can be read and/or modified and may or may not be representative of the physical connection between the parts.

The secure application 108 further provides or "hosts" a secure clock 112 for use in performing one or more secure operations.

In some examples the system 100 may form part of a system on a chip (SOC) arrangement 104. Thus, the at least one processor 106 may be provided by the SOC. In some examples, the system 100 may be powered by a power source with finite energy, such as a battery, and therefore the provision of low-power-modes may be important.

It will be appreciated that in some embodiments the at least one processor 106 may comprise a single processor 106 comprising at least two cores comprising a first core and a second core. The first core may be configured to execute the secure application 108 and the second core may be configured to execute the non-secure application 110. In one or more examples, the system 100 may comprise multiple processors (not shown) wherein a first processor may be configured to execute the secure application 108, and a second processor may be configured to execute the non-secure application 110. In one or more examples, a secure processor and a non-secure processor may be located on separate integrated circuit (IC) dies. It will be appreciated that in one or more examples, the first processor may comprise a trusted execution environment (TEE) in which the secure application 108 can be executed. As is known in the art, a TEE is a secure area of the at least one processor 106 which can prevent unauthorised entities from altering data within the TEE. In some examples the secure application 108 may be executed in said TEE and the non-secure application 110 may be executed outside the TEE.

It will be appreciated that in some examples the secure application 108 can be executed in a more secure area of the processor 106 or by a dedicated secure processor or dedicated core within a common processor 106. In such examples, time critical processes can be performed by a more secure part of the system 100 and the bulk of the processing can be performed by the non-secure parts of the same system 100. This can lead to a system 100 which has an improved overall power consumption profile.

Figure 2:
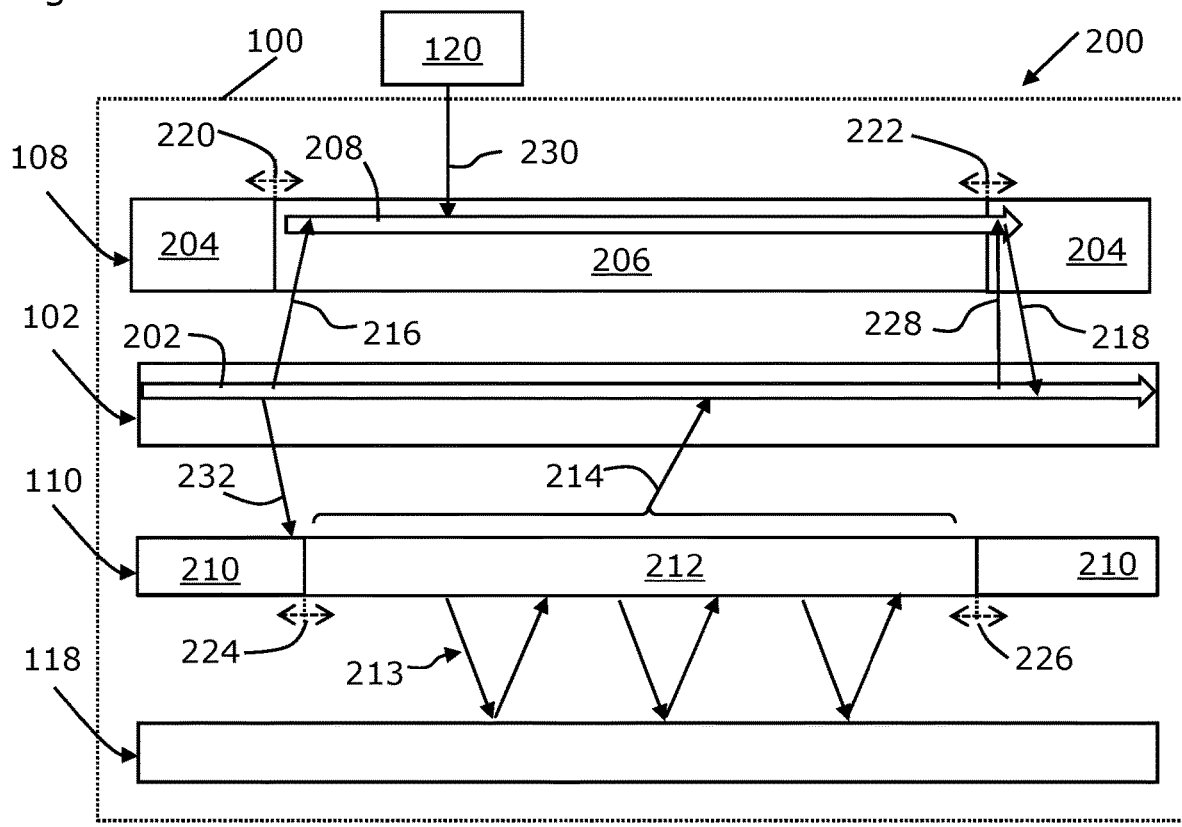
FIG. 2 shows a functional block diagram illustrating an example timeline of the operation of the system of FIG. 1.

FIG. 2 is a timeline outlining an example method of operation of the system 100 and the exchange of data between the RTC 102, the secure application 108 and the non-secure application 110. FIG. 2 shows a representation of the RTC 102 wherein the record of the current time 202 it keeps is represented by the arrow. A representation of the non-secure application 110 is shown as a second bar. A representation of an external time reference 118 is shown as a further bar, which may be available during the operation of the system 100. The non-secure application 110 may be configured to send and/or receive signals 213 from the external time reference 118 for use in updating, calibrating, or, more generally, modifying the record of the current time 202 of the RTC 102 by way of a clock modification procedure 214. A representation of the secure application 108 is shown as a further bar in FIG. 2.

The secure application 108 and the non-secure application 110 are configured to operate in different modes which are indicated by the shaded blocks in FIG. 2. The secure application 108 has a first low-power-mode 204 and a first normal-mode 206, wherein the time of a transition from the first low-power-mode to the first normal-mode 206 is indicated by region 220. FIG. 2 further shows the time of a transition from the first normal-mode 206 to the first low-power-mode 204 indicated by region 222. Thus, the secure application 108 may be configured to switch between the normal-mode 206 and the low-power-mode 204 during operation of the system. In some examples, the first low-power-mode 204 comprises a mode in which the operations performed by the secure application 108 are reduced or the rate at which they are performed is reduced compared to the first normal-mode 206. In some examples the secure application may be dormant during the low-power-mode 204.

The non-secure application 110 has a second low-power-mode 210 and a second normal-mode 212, wherein the time of a transition from the second low-power-mode 210 to the second normal-mode 212 is indicated by region 224. FIG. 2 further shows the time period of a transition from the second normal-mode 212 to the second low-power-mode 210 indicated by region 226. In some examples, the second low-power-mode 204 comprises a mode in which the operations performed by the non-secure application 110 are reduced or the rate at which they are performed is reduced compared to the second normal-mode 212. In some examples the non-secure application may be dormant during the low-power-mode 204.

FIG. 2 also shows various clock read and write procedures 216, 218, 228, 232 and 234 performed by one or more of the secure application 108 and non-secure application 110 as will be described below.

In the present example, the real time clock (RTC) 102 is configured to keep the record of the current time 202 when the secure application 108 is in the first normal-mode 206 and the first low-power-mode 204. The real time clock may be available for time based processing performed by the non-secure-application. It will be appreciated that the current time may be the current time of day and, optionally, the current time of day and date, such as for the local time zone in which the system 100 is operating. In some examples, the current time may be based on signals 213 from the external time reference 118 to update the record of the current time 202. In some examples, the said external time reference 118 may be derived from signals 213 obtained from one or more of a global positioning system (GPS), a global navigation satellite system (GNSS), or from one or more network time protocol (NTP) signals, provided to the non-secure application 110 of the system 100. In one or more examples, the non-secure application 110 may be configured to request, such as periodically, the current time from the external time reference 118. In some examples the record of the current time 202 may be recorded in a memory (not shown) within the RTC 102 or alternatively within a memory (not shown) provided by the system 100.

In some examples the RTC 102 may be a hardware based RTC. Thus, in one or more examples, circuitry may be provided, including an oscillator, to store and keep a record of the passage of time. It will be appreciated that a hardware based RTC can be based on an oscillator of a particular frequency as is known in the art. In some examples, the hardware based real time clock may be a 32 kHz (e.g. 32.768 kHz) clock. The benefits of such a hardware clock may include a small size, lower power requirements and high accuracy.

The system 100 may be configured such that the RTC 102 is modifiable, such as by the non-secure-application 110 as part of the aforementioned clock modification procedure. This allows for easy updating of the RTC for valid reasons, but may also allow for malicious updating of the RTC 102. The non-secure application 110 may update the RTC 102 for various reasons.

In some examples, the non-secure application 110 may be configured to use the external time reference 118 to update the RTC 102, and in particular the record of the current time 202 of the RTC. In some examples the system 100 or non-secure application 110 may be configured to perform the clock modification procedure 214 based on a detected difference between the record of the current time 202 provided by the RTC 102 and a time provided by said external time reference 118. Thus, the external time reference 118 may be used to update the record of the current time 202 provided by the RTC 102 when a difference between the RTC 102 and the external time reference 118 exceeds a threshold. It will be appreciated that the difference between the RTC 102 and the external time reference 118 may be due to inaccuracies within the RTC 102 itself, such as drift, or may be introduced due to an external attack which causes the non-secure application 110 to update the record of the current time 202 such that it is no longer representative of the actual current time.

In some examples the system 100 may be configured to perform the clock modification procedure 214 based on a change in temperature to ensure correct calibration of the RTC 102 is maintained. It will be appreciated that the output of the RTC 102 may drift due to fluctuations in temperature. In some examples, there may be an acceptable temperature change which the system 100 can tolerate without having to update the RTC. However, if the temperature change exceeds a predetermined value, the system 100 may be configured to update the RTC 102 based on a signal from the external time reference 118. Thus, the non-secure application may be configured to account for environmental changes to ensure accurate operation of the RTC.

In the present embodiment the secure application 110 is configured to provide the secure clock 112 for maintaining a secure record of the current time 208 when operating in the first normal-mode 204. The secure record of the current time is represented by the arrow in the bar 108 of FIG. 2. It will be appreciated that the secure record of the current time 208 is a record that is more resilient to attack or more resilient to unauthorised modification compared to the record of the current time 202 provided by the RTC 102. Therefore, the secure record of the current time can be considered to be a trusted record which can be used to perform the time critical processes.

However, in the present example, it is not possible for the secure application 110 to host the secure clock in the low-power-mode. The secure clock 112 may thus be considered disabled during the first low-power-mode 204, which may be to reduce the power consumption of the system 100. The following paragraphs explain how the system 100 and secure application 108 may be configured such that a trusted record of time can be maintained while the secure application 110 is in the low-power-mode.

In the present embodiment the non-secure application 110 is configured to be able to perform the clock modification procedure 214 when the non-secure application 110 is operating in the second normal-mode 212 but not when operating in the second low-power-mode 210. Thus, in some examples the clock modification process 214 may only occur after the non-secure application 110 has powered-up (i.e. after transition 224). It will be appreciated that the non-secure application 110 is susceptible to attack. As such, the clock modification procedure 214 may by hijacked to cause malicious updating of the current time 202.

In one or more examples, the RTC 102 is configured to be operable during the first low-power-mode 204, the first normal-mode 206, the second low-power-mode 210 and the second normal-mode 212. Thus, the RTC 102 is operable at times that the system 100 is powered. In some examples the secure clock 112 may be configured to operate together with the RTC 102 only when the secure application 108 is in the first normal-mode 206. Furthermore the system may not be required to maintain the secure record of the current time 208 whilst the non-secure application 110 cannot modify the record of the current time 202 to thereby save system 100 resources.

In the present embodiment, the secure clock initialisation procedure 216 comprises obtaining the record of the current time 202 from the RTC 102 for initialising the secure clock 112 based on the transition 220 from the first low-power-mode 204 to the first normal-mode 206. It will be appreciated that the secure clock initialisation procedure 216 may be performed via the first communication link 116 once the secure application 108 is operating in the first normal-mode 206. The secure application 108 may be configured to initiate the secure clock initialisation procedure 216 in response to the transition from the first low-power-mode 204 to the first-normal mode 206.

It will be appreciated that initialising the secure clock 112 may comprise taking a snapshot of the current time from the record of the current time 202 from the RTC 102. This snapshot can be used to set an initial value of the secure clock 112. In some examples, the initial value may be set to the current time provided by the RTC 102 and wherein the secure clock 112 may be configured to continue to measure the passage of time and thereby maintain the secure record of the current time 208. In other examples, the snapshot may be used as an initial time indicating when the clock initialisation procedure occurred and the secure clock 112 may comprise a timer arrangement (not shown). The timer arrangement may be configured to determine an elapsed time since the most recent clock initialisation procedure 216. Thus, the secure record of the current time 208 may therefore be based on the snapshot of the current time 202 from the RTC 102 taken during the clock initialisation procedure 216 and the elapsed time determined by the timer arrangement of the secure clock 112.

The clock initialisation procedure, in the present example, is configured to be performed prior to any clock modification procedure by the non-secure application 110.

In the present embodiment, the secure application 108 is configured to perform a clock update procedure 218 as part of the transition 222 from the first normal-mode 206 to the first low-power-mode 204. It will be appreciated that the transition 222 may be part of a power-down period to the first low-power-mode of the secure application 108 as described above. In the present embodiment the clock update procedure 218 comprises updating the RTC 102 with the secure record of the current time 208 or, put another way, setting the RTC 102 to the current time as maintained by the secure clock 208. In the present embodiment, the clock update procedure 218 is performed via the first communication link 116 between the secure application 108 and the RTC 102 following an instruction from the system 100 to enter the first low-power-mode 204. In some examples, the system 100 may be configured to perform the clock update procedure 218 after the secure application 108 has transitioned into the first low-power-mode 204. In some examples the secure application 108 provides instructions to the system 100 to perform the clock update procedure 218 prior to completing said transition 222.

In the above example, the clock update procedure is performed unconditionally as part of the transition to the first low-power-mode 204. However, in other examples, the clock update procedure may be performed conditionally. In some examples, based on detecting the transition 222 from the first normal-mode 206 to the first low-power-mode 204, the system 100 may be configured to compare the record of the current time 202 from the RTC 102 with the secure record of the current time 208 from the secure clock 112. This will allow the system 100 to determine whether there is a difference between the record of the current time 202 and the secure record of the current time 208. The system 100 may be configured such that the clock update procedure 218 is conditional on the comparison indicating a difference between the record of the current time 202 and the secure record of the current time 208 being above a predetermined threshold. Thus it will be appreciated that the clock update procedure 218 only needs to be performed if it is determined that the record of the current time maintained by the RTC 102 differs by more than the predetermined threshold, which may be indicative of the RTC 102 having been tampered with. In other examples the clock update procedure 218 only needs to be performed if the difference between the non-secure clock 102 and the secure clock 112 is such that the validity of time based certificates cannot be verified or when time critical actions cannot be accurately performed. In some examples, the system 100 may be configured to not perform the clock update procedure 218 when the difference between the record of the current time 202 and the secure record of the current time 208 is below the predetermined threshold. This approach may allow for further power saving by reducing unnecessary clock updates from being performed by the secure application 108.

In some examples the predetermined threshold is defined as a percentage of the elapsed time, that is the time since the most recent clock initialisation procedure. In some examples, the secure application 108 includes a secure record of the current time 208 and a value of the elapsed time. In some examples the predetermined threshold (which may be thought of as the maximum permitted drift of the RTC 102 relative to the secure clock 208) may be defined as 1% of the elapsed time. However, the percentage may be more or less than 1%. In other examples the predetermined threshold may be much less than 1% such as 0.001%. It will be appreciated that the value selected for the predetermined threshold depends on the relative accuracy and precision of the clocks and/or timer arrangement used. By defining the predetermined threshold as a percentage of the elapsed time, any drifting apart of the RTC 102 and the secure clock 208 may be accounted for rather than arriving at a conclusion that the RTC 102 has been maliciously modified. Also, if the predetermined threshold is a fixed amount, then switching in and out of the first low-power-mode could be used to avoid the threshold being exceeded while still maliciously modifying the RTC 102. Setting the predetermined threshold to a percentage of the elapsed time may mitigate against such a malicious strategy.

In some examples, the system 100 and in particular the secure application 108, may be configured to generate a signal indicative of whether the difference between the record of the current time 202 and the secure record of the current time 208 is above the predetermined threshold or below the predetermined threshold. The system may be configured such that the generated signal provides for keeping a log of whether the record of the current time 202 is correct or not. In some examples this log may be indicative of the occurrence of an attacks or when an accumulated drift has exceeded the predetermined threshold. Thus, in some examples the predetermined threshold may comprise a first predetermined threshold and a second predetermined threshold. In some examples the first predetermined threshold may be indicative of a level of drift that requires the RTC to be recalibrated and the second predetermined threshold, which may be larger than the first predetermined threshold, may be indicative of an external attack. In some examples the system 100 may be configured to store the log. The log may provide a record of the status of RTC 102. In some other examples the record of the status of the RTC 102 may be stored in a memory (not shown) of the system 100 and or a memory (not shown) of the at least one processor 106. Thus it will be appreciated that the record of the status of the RTC can be used to log events such as suspected attacks on the system 100 which can be used to further manage the system 100.

In the present embodiment, the system 100 is further configured to prevent the non-secure application 110 from performing the clock modification procedure 214 after the clock update procedure 218 has been performed. Thus, the updated RTC 102 can be considered as being trusted by the secure application prior to the non-secure application 110 performing a subsequent clock modification procedure 214 after said clock update procedure. In the present embodiment, the non-secure application 110 is also prevented from performing the clock update procedure whilst the secure application 108 is in the low-power-mode 204 and prior to a subsequent clock initialisation procedure 216 being performed when the secure application awakens from the first low-power-mode.

In the present example, the system 100 is configured such that first low-power-mode and the second low-power-mode are adopted by the secure application and the non-secure application at substantially the same time. Thus, the system 100 may be considered to have a low-power-mode, which includes placing the secure application and non-secure application in the first and second low-power-modes. Likewise, in the present example, the system 100 is configured such that the first normal-mode and second normal-mode are adopted by the secure application and the non-secure application at substantially the same time. Thus, the system 100 may be considered to have a normal mode, which includes placing the secure application and non-secure application in the first normal-mode and second normal-mode. Thus, in the low power mode, the secure application hands over responsibility to the RTC 102 for keeping a record of time while it is in the first low-power-mode. Modification of the RTC 102 is prevented because the non-secure application 110 is in the second low-power-mode. When the system 100 adopts the normal mode once again, the system 100 is configured such that the clock initialisation procedure occurs before a clock modification procedure, and therefore the record of time kept by the RTC can be trusted and the secure clock 208 initialised with confidence.

However, irrespective of how the normal and low power modes are provided, the updated RTC 102 (i.e., once the clock update procedure 218 has been performed) can be considered to be secure during the first low-power-mode 204 and the second low-power-mode 210.

Thus, by providing the clock initialisation procedure and the clock update procedure and limiting when the clock modification procedure can be performed, the secure application can trust the RTC while the secure application 108 is in the first low-power-mode 204. However, when the secure application 108 in the first normal-mode 206 and the non-secure application 110 is in the second normal-mode 212 and therefore the clock modification procedure is permitted, the secure application 108 maintains its own, secure, time 208 by way of the secure clock.

The system 100 may be configured to prevent the non-secure application 110 from performing the clock modification procedure 214 in various ways.

In some examples, the system 100 may be configured to perform the clock update procedure 218 after the non-secure application 110 has transitioned from the second normal-mode 212 to the second low-power-mode 210. In some examples this may be determined by the detection of transition 226 of the non-secure application 110. Thus, the system 100 may be configured such that the non-secure application 110 is unable to update or otherwise modify the record of the current time 102 once the secure application 108 has performed the clock update procedure 218 (i.e. until the next clock initialisation procedure).

In some other examples, the system 100 may be configured to block communication over the second communication link 114 to prevent the clock modification procedure while the secure application is in the first low-power-mode and until it performs the next clock initialisation procedure. Thus, in some examples the second communication link 114 may be blocked whilst the non-secure application is in the second normal-mode 212 such that the non-secure application 110 is actively prevented from performing the clock modification procedure 214.

In some examples, the secure application 108 may be configured to perform secure processing at least in part based on said secure record of the current time 208. It will be appreciated that secure processing includes actions performed by the secure processor 108 which require a trusted or secure clock 112. As such, the record of the RTC 102 which has been modified by the clock modification process 214 cannot be used to perform such secure processing. In some examples the secure processing may include one or more of an application of a cryptographic function to data and checking a validity of a security certificate. In some examples, the secure processing may comprise determining the validity of a subscription. In yet another example, the secure processing may comprise application of a secure time stamp (i.e. a time stamp that is based on the secure clock and can therefore be trusted) to entries in a log. Thus, the system 100 may be configured to provide the secure clock 112 for performing said secure processing only when the secure application is executed. Thus, the system does not need a dedicated secure clock to be active whilst the secure application 108 and the non-secure application 110 are in their respective first lower-power mode 204 and the second low-power-mode 210. This can allow for the provision of a more secure system 100 with reduced power consumption whilst maintaining the integrity of the RTC 102 over subsequent mode transitions of the secure application 108 and the non-secure application 110.

FIG. 1 further shows a trusted entity 120 configured to be communicably coupled to the secure application 108 and an external time reference 118 configured to be communicably coupled to the non-secure application 110.

In some situations the RTC 102 may be modified for valid reasons, such as when the system 100 is operated in different time zones, or to account for daylight saving time. Accordingly, it may be useful to be able to also update the secure record of the current time maintained by the secure application 108.

Thus, in one or more examples, the secure application 108 may be further configured to perform a secure clock update procedure 218 to update the secure record of the current time 208. In some examples the secure clock update may be based on an authenticated message 230 received from a trusted entity 120. The authenticated message may be configured to provide for updates to the secure record of the current time 208. It will be appreciated that without updating the secure record of the current time 208, the system 100 may perform the clock update procedure 218 using the secure record of the current time 208 but this secure record is, in reality, incorrect. This can also lead to an erroneous assessment of the difference between the record of the current time 202 and the secure record of the current time 208. In some examples this can lead to undesirable system 100 behaviour.

It will be appreciated that the authenticated message 230 may comprise a correction to be applied to the secure record of the current time 208. In other examples the authenticated message may include an updated time which can be used to update the secure record of the current time 208.

It will also be appreciated that the authenticated message may also be accompanied by a freshness check to prevent repeat attacks, as is known in the art.

Typically, the non-secure application is configured to obtain 232 the record of the current time 202 from the RTC 102 to perform time based functions. However, in some examples it may be advantageous for the non-secure application to have access to the secure time. Thus, the non-secure application 110 may be configured to have read-only access 234 to the secure record of the current time 208 to obtain a value of the secure record of the current time 208 to perform critical time based functions by the non-secure application.

Figure 3:
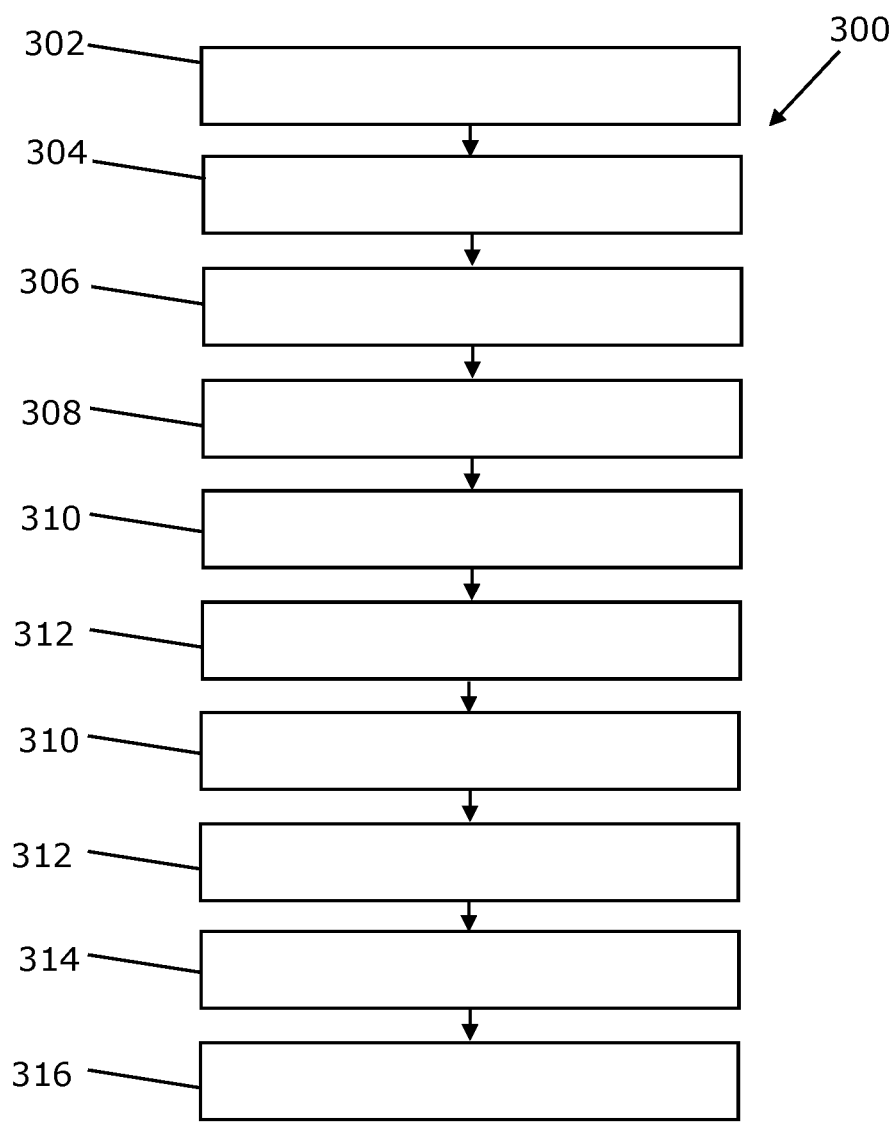
FIG. 3 shows a flowchart illustrating an example method performed by the system of FIG. 1.

FIG. 3 shows a method 300 for operating the secure system 100, the system comprising:
  a real time clock, RTC, configured to keep a record of a current time;
  at least one processor configured to execute at least a secure application and a non-secure application, wherein
  the secure application configured to operate in a first low-power-mode and a first normal-mode and wherein the non-secure application is configured to operate in a second low-power-mode and a second normal-mode;
  the method comprising:
  maintaining 302, by a secure clock, a secure record of the current time by the secure application when configured to operate in the first normal-mode; and
  disabling 304 the secure clock when the secure application is configured to operate in the first low-power-mode;
  performing 306, by the non-secure application, when configured to operate in the second normal-mode a clock modification procedure to update the RTC; and
  preventing 308 the non-secure application from performing the clock modification procedure when the non-secure application is configured to operate in the second low-power-mode;
  performing 310, by the secure application, a secure clock initialisation procedure comprising obtaining the record of the current time from the RTC for initialising the secure clock based on a transition from the first low-power-mode to the first normal-mode;
  performing 312, by the secure application, a clock update procedure as part of a transition from the first normal-mode to the first low-power-mode, wherein the clock update procedure comprises:
  updating 314 the RTC with the secure record of the current time; and
  preventing 316 the non-secure application from performing the clock modification procedure after the clock update procedure has been performed, whilst the secure application is in the low-power-mode and prior to a subsequent secure clock initialisation procedure.

It will be appreciated that the above method may be run over a plurality of transitions between the first/second normal-mode and the first/second low power modes. It will be appreciated that upon each cycle the secure clock will be used to update the RTC such that the RTC will be corrected to the value of the trusted clock. Furthermore, it will be appreciated that the method will prevent the clock modification procedure 214 from being performed prior to the non-secure application 110 entering the second normal-mode 212 and after the non-secure application leaves the second normal-mode 212. Thus the method can ensure that the RTC 102 can only be modified by the clock modification procedure by the non-secure application whilst it is in the second normal-mode 212. Therefore it will be appreciated that whilst the RTC is susceptible to modification, the secure application will maintain a secure clock to ensure that the RTC 102 can be corrected to remove any unauthorised modification/errors and to thereby provide a trusted RTC in all modes of operation.

The method may further include performing 312 the clock update procedure after the non-secure application has transitioned from the second normal-mode to the second low-power-mode.

The method 300 may further include performing 306 the clock modification procedure based on a change in temperature for calibration of the RTC.

Figure 4:
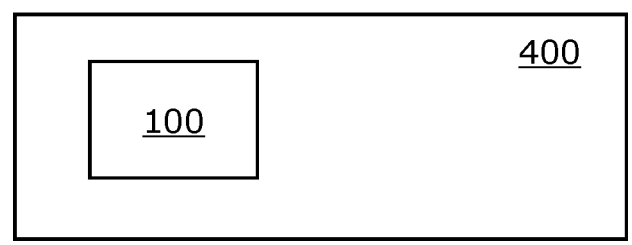
FIG. 4 shows an electronic device comprising the system of FIG. 1.

FIG. 4 shows an example of an electronic device 400 comprising the system 100. The electronic device 400 of FIG. 4 may include a portable device comprising one or more of laptops, tablets, or any internet of things (IOT) enabled device which is powered by a battery. In other examples, the battery powered device may form part of a vehicle such as a car or an electric car, or an electric bike. Such devices may require a secure or trusted clock to perform secure time based actions whilst reducing power consumption and reducing die area to thereby reduce manufacturing costs and to improve efficiency.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A system comprising:
a real time clock, RTC, configured to keep a record of a current time,
at least one processor configured to execute at least a secure application and a non-secure application, wherein
the secure application is configured to operate in a first low-power-mode and a first normal-mode, wherein the secure application is configured to provide a secure clock for maintaining a secure record of the current time when operating in the first normal-mode, and wherein the secure clock is disabled during the first low-power-mode; and wherein
the non-secure application is configured to operate in a second low-power-mode and a second normal-mode, wherein the non-secure application is configured to perform a clock modification procedure to update the RTC via a second communication link between the non-secure application and the RTC when the non-secure application is operating in the second normal-mode and not when the non-secure application is operating in the second low-power-mode; and wherein
the system is configured to cause the secure application to perform a secure clock initialization procedure comprising obtaining the record of the current time from the RTC for initializing the secure clock based on a transition from the first low-power-mode to the first normal-mode, wherein
the secure application is configured to perform a clock update procedure as part of a transition from the first normal-mode to the first low-power-mode, the clock update procedure comprising, via a first communication link between the secure application and the RTC, providing for updating of the RTC with the secure record of the current time, and wherein
the system is further configured to prevent the non-secure application from performing the clock modification procedure after the clock update procedure has been performed, whilst the secure application is in the first low-power-mode and prior to the secure clock initialization procedure.

2. The system of claim 1, wherein the RTC is a hardware based RTC.

3. The system of claim 1, wherein
the system being further configured to prevent the non-secure application from performing the clock modification procedure after the clock update procedure has been performed comprises:
the system being configured to perform the clock update procedure after the non-secure application has transitioned from the second normal-mode to the second low-power-mode.

4. The system of claim 1, wherein
the system being further configured to prevent the non-secure application from performing the clock modification procedure after the clock update procedure has been performed comprises:
the system being configured to block communication over the second communication link.

5. The system of claim 1, wherein the system is configured to perform the clock modification procedure based on a detected change in temperature for calibration of the RTC.

6. The system of claim 1, wherein
the non-secure application is configured to an indication of the current time from an external time reference, and wherein the system is further configured to perform the clock modification procedure based on a difference between the RTC and said current time from the external time reference.

7. The system of claim 1, wherein
based on the transition from the first normal-mode to the first low-power-mode, the system is further configured to compare the record of the current time from the RTC with the secure record of the current time from the secure clock, and wherein
performing the clock update procedure is conditional on the comparison indicating a difference between the record of the current time and the secure record of the current time above a predetermined threshold.

8. The system of claim 7, wherein
the system is configured to generate a signal indicative of whether the difference between the record of the current time and the secure record of the current time is above the predetermined threshold or below the predetermined threshold, and wherein
the system is configured to store the generated signal to provide a record of a status of RTC.

9. The system of claim 7, wherein the predetermined threshold is based on an elapsed time since a most recent clock initialization procedure, wherein the elapsed time is based on the secure clock.

10. The system of claim 9, wherein
the secure clock comprises a timer arrangement configured to determine the elapsed time since the most recent clock initialization procedure, and wherein
the secure record of the current time is based on a snapshot of the current time from the RTC taken during the secure clock initialization procedure and the elapsed time.

11. The system of claim 9, wherein
the predetermined threshold is defined as a percentage of the elapsed time.

12. The system of claim 1, wherein
the secure application is further configured to perform a secure clock update procedure to update the secure record of the current time based on an authenticated message from a trusted entity.

13. The system of claim 1, wherein
the secure application is configured to perform secure processing at least in part based on said secure record of the current time.

14. The system of claim 13, wherein
the secure processing includes one or more of:
an application of a cryptographic function to data, and
checking a validity of security certificates.

15. An electronic device comprising the system claim 1.

16. A method of operating a system, the system comprising:
a real time clock, RTC, configured to keep a record of a current time,
at least one processor configured to execute at least a secure application and a non-secure application, wherein the secure application is configured to operate in a first low-power-mode and a first normal-mode, wherein the secure application is configured to provide a secure clock for maintaining a secure record of the current time when operating in the first normal-mode, and wherein the secure clock is disabled during the first low-power-mode; and wherein the non-secure application is configured to operate in a second low-power-mode and a second normal-mode, wherein the non-secure application is configured to perform a clock modification procedure to update the RTC via a second communication link between the non-secure application and the RTC when the non-secure application is operating in the second normal-mode and not when the non-secure application is operating in the second low-power-mode; and wherein the method comprises:

performing, by the secure application, a secure clock initialization procedure comprising obtaining the record of the current time from the RTC for initializing the secure clock based on a transition from the first low-power-mode to the first normal-mode;

performing, by the secure application, a clock update procedure as part of a transition from the first normal-mode to the first low-power-mode, the clock update procedure comprising, via a first communication link between the secure application and the RTC, providing for updating of the RTC with the secure record of the current time; and preventing the non-secure application from performing the clock modification procedure after the clock update procedure has been performed, whilst the secure application is in the first low-power-mode and prior to a subsequent secure clock initialization procedure.

17. The method of claim 16, wherein the method comprises:
performing the clock update procedure after the non-secure application has transitioned from the second normal-mode to the second low-power mode.

18. The method of claim 16, wherein the method comprises:
performing the clock modification procedure based on a change in temperature for calibration of the RTC.

19. The system of claim 1, wherein
the at least one processor comprises a single processor comprising at least two cores comprising a first core and a second core, wherein,
the first core is configured to execute the secure application and
the second core is configured to execute a non-secure application.

20. The system according to claim 1, wherein
the system forms part of a system on a chip (SOC) arrangement.

* * * * *